Oct. 15, 1929.  A. S. MANCIB  1,732,100
THERMOSTATIC CONTROL SYSTEM
Filed Feb. 12, 1925  2 Sheets-Sheet 1
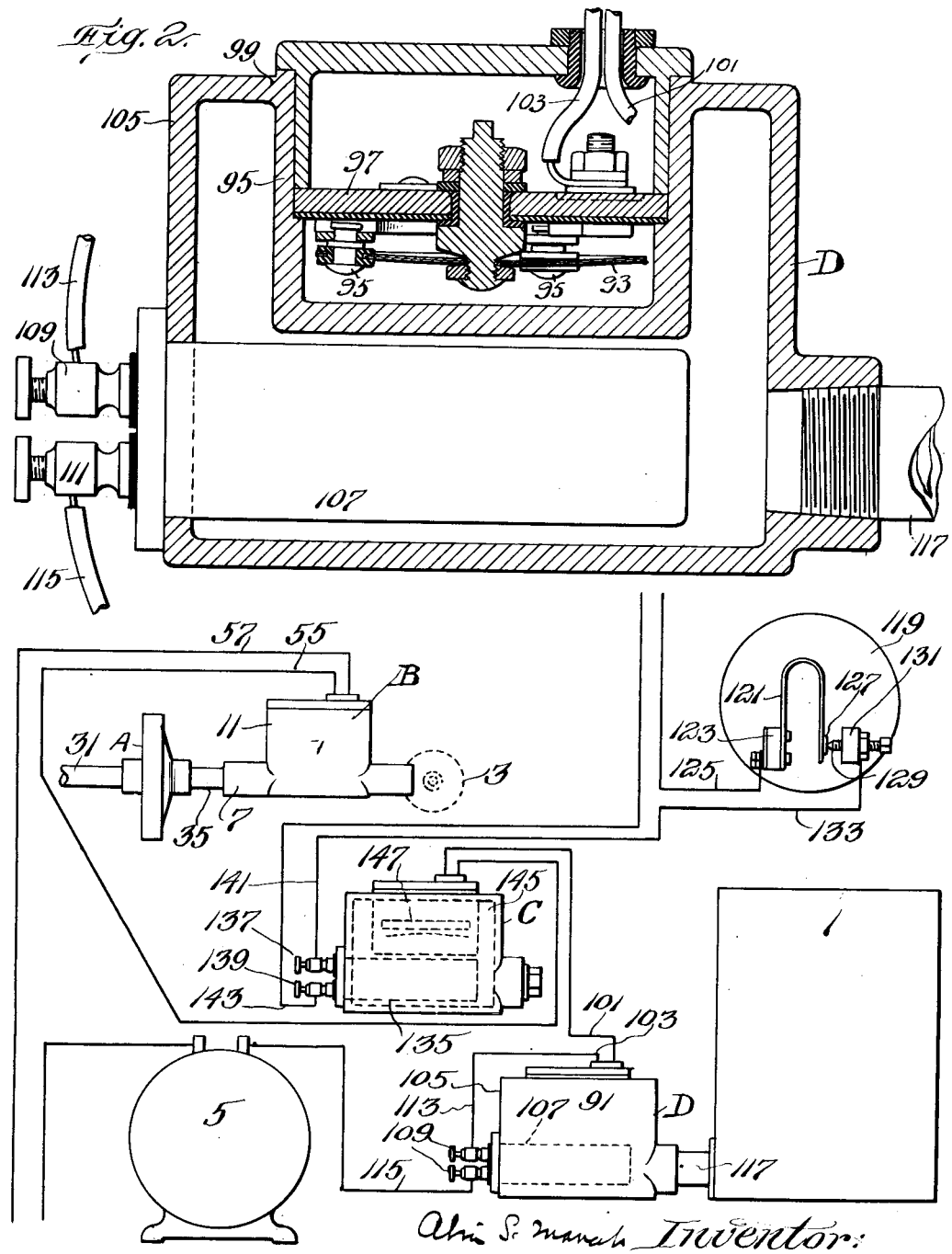

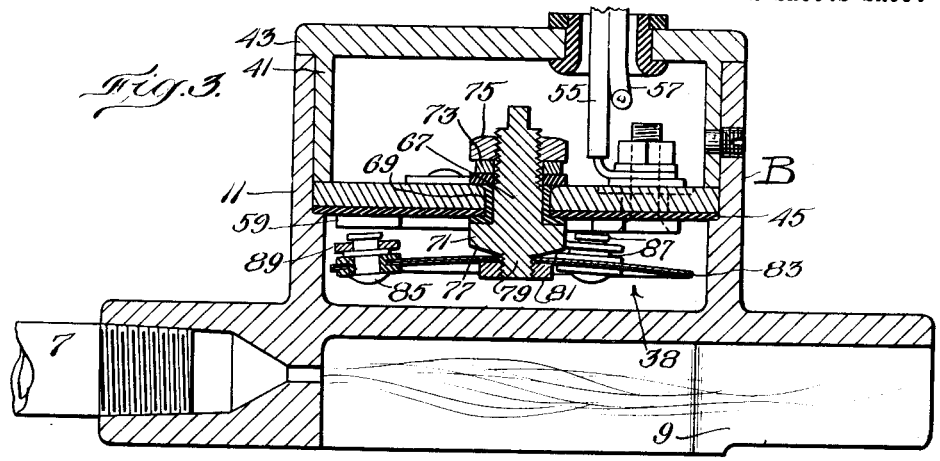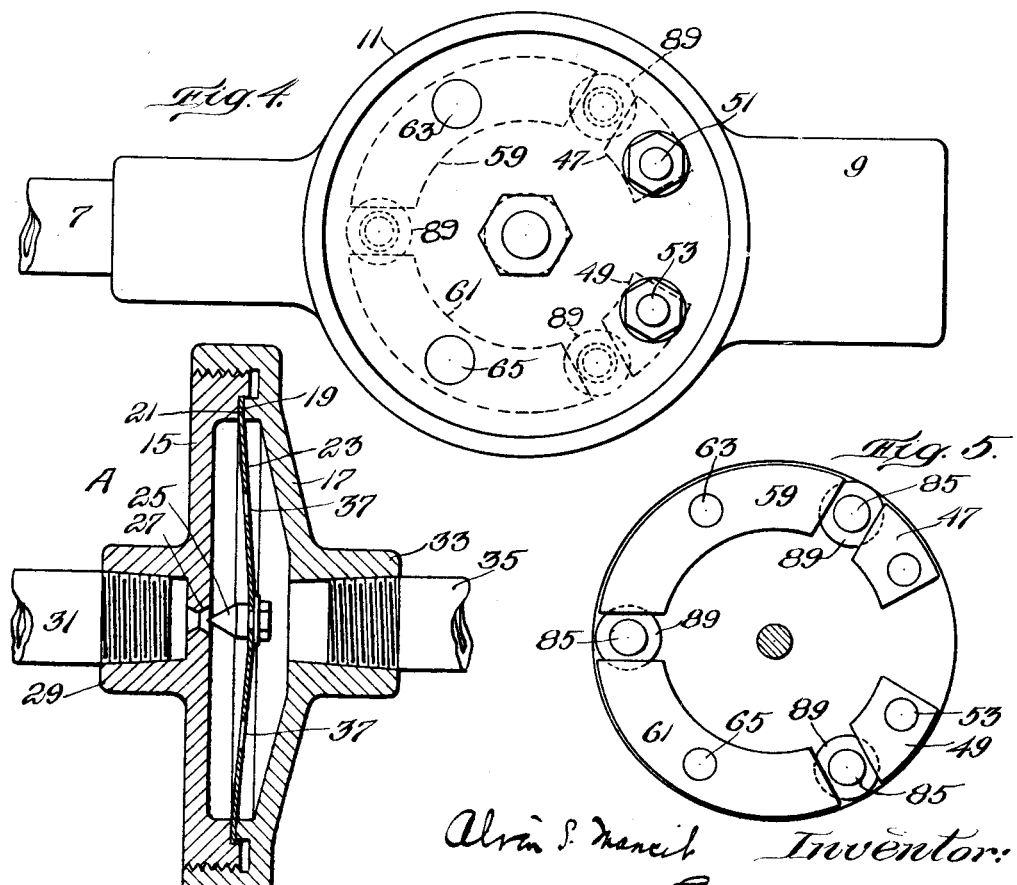

Patented Oct. 15, 1929

1,732,100

UNITED STATES PATENT OFFICE

ALVIN S. MANCIB, OF SOMERVILLE, MASSACHUSETTS, ASSIGNOR TO NATIONAL ELECTRICAL INSTRUMENT COMPANY, OF CAMBRIDGE, MASSACHUSETTS, A CORPORATION OF MASSACHUSETTS

THERMOSTATIC CONTROL SYSTEM

Application filed February 12, 1925. Serial No. 8,746.

This invention relates to thermostatic control systems for oil burning apparatus.

It is the general object of the invention to devise a control system which, in addition to regulating the burner in accordance with the temperature requirements of the room or apparatus which it heats, will also take care of the various emergencies that may arise.

A typical oil burner installation includes a burner, a pilot light located closely adjacent to the burner nozzle to ignite the oil when it is turned on to the burner, and an electric motor adapted to supply mechanical power continuously for driving a pump to feed oil to the burner or for operating a blower to force air to the burner.

In the usual domestic installation equipped with an automatic control system, the control is effected through a thermostat located in a room of the dwelling to be heated. This thermostat opens or closes a circuit which controls the operation of the motor. It has been found in using these systems that as the thermostat opens or closes the control circuit it is likely to vibrate, thus starting the motor into operation for a few seconds and then stopping it again. This action may take place several times before the motor is either definitely cut out of action or brought into operation, in accordance with the change of temperature conditions at the thermostat. To devise a control system which will obviate this difficulty constitutes one of the objects of the present invention.

While it is intended that the pilot light should continuously present a flame at the burner, it sometimes happens that the flame is accidentally extinguished. In such event it is important that the supply of fuel to the pilot light shall be cut off. Another object of the invention, therefore, is to provide means for automatically performing this operation.

Where the burner is used to heat a boiler it is extremely important that the burner shall be shut down in case the water in the boiler drops to a dangerous level, since otherwise the boiler may be ruined. Accordingly, it is another object of this invention to devise an automatic mechanism for accomplishing this result.

The nature of the invention will be readily understood from the following description when read in connection with the accompanying drawings, and the novel features will be particularly pointed out in the appended claims.

Referring now to the drawings,

Figure 1 is a diagram showing a boiler, an electric motor, burner, pilot light and a thermostatic control system therefor embodying the invention;

Fig. 2 is a vertical section through the thermostatic control for stopping the electric motor in case the level of the water in the boiler becomes too low;

Fig. 3 is a vertical section through the pilot light thermostatic control;

Fig. 4 is a horizontal section taken on the line 4—4 of Fig. 3;

Fig. 5 is a plan of the contacts and switches appearing in Figs. 3 and 4; and

Fig. 6 is a section through the thermostatically operated valve for cutting off the supply of gas to the pilot light.

Referring to the drawings, the apparatus shown therein as one good form of the invention, comprises a boiler 1 (Fig. 1) of a common type. 3 represents the nozzle of an oil burner which may be of any suitable construction. The oil may be fed to the burner by a suitable pump driven by an electric motor 5, and air may be forced to the burner by a blower which also is driven by this motor, the motor thus being used to operate the burner. This arrangement necessarily will depend on the type of burner used.

Adjacent to the burner 3 is the pilot light 7 arranged to direct its flame under a hood 9

(Fig. 3) at the bottom of a casing 11. In order to automatically shut off the supply of gas or other fuel to the pilot light in case its flame becomes extinguished, a thermostatic control A, (Figs. 1 and 6) is provided. This control, in the present instance, comprises a casing conveniently formed of two parts 15 and 17 threaded together. The part 15 has a counterbore seat 19, and the part 17 has a ring 21 opposed to said seat. Confined between the seat and ring is a thermostat disk 23 which is dish-shaped and is made of dissimilar metals welded or otherwise secured together and having different coefficients of expansion for heat. These metals may be chrome nickel steel and invar, the latter being the trade name of an alloy of steel and nickel which, when made with 36.2 percent nickel, has a coefficient of expansion for heat which is virtually zero. The invar sheet is outside of the steel sheet so that when the disk is heated it will gradually flatten until it reaches a critical point when it will suddenly snap into an oppositely dished position. Similarly, as the return is made to its original temperature condition, the disk will snap back to its initial position. These movements of the disk are utilized to open and close a valve 25 which is secured to the center of the disk and cooperates with a seat 27 formed in the casing part 15. Projecting from the casing part 17 is a boss 33 in which is threaded a short pipe 35 leading to the pilot light. The thermostat disk 23 has apertures 37 therein through which gas may flow when the valve 25 is open.

So long as the pilot light is burning, the temperature at the thermostat disk 23 will be sufficiently high so that the valve will be held open. If the flame of the pilot light becomes extinguished, the hood 9 and casing 11 referred to, will cool, and the temperature at the thermostat disk 23 will drop, thus causing it to shift to the left (Fig. 6) and snap the valve 25 into its seat.

The electric circuit for the motor 5 includes a switch 38 of a thermostatic control element B (Fig. 3). This switch comprises a base 39 confined between a ledge in the casing 11 and a flange 41 on the cover 43 of the casing, said cover being detachably secured by suitable screws. A plate 45 of insulation material covers the lower face of the base 39. Two contacts 47 and 49 are mounted on this insulating plate and are secured to the base by bolts 51 and 53, which also serve to connect said contacts with the leads 55 and 57 of the motor circuit. Also mounted on the insulating plate 45 are two contacts 59 and 61 secured to the base by rivets 63 and 65, said contacts being spaced from each other and also spaced from the contacts 47 and 49.

A post 67 (Fig. 3) projects through the base and insulating plate and is insulated from the base by a sleeve 69. A head 71 on the post rests upon one end of said sleeve, and a washer 73 engages the lower end of the sleeve and is held against it by a nut 75 threaded on the post. The lower side 77 of the head is tapered, and projecting from the head is a stud 79 threaded to receive a nut 81. A thermostat disk 83 has a central hole through which the stud 79 projects, said disk being susceptible of limited movement in the space between the tapered surfaces of the head and the nut 81. This disk is apertured to receive three studs 85, each having a pair of flanges 87 spaced to receive between them a floating contact in the form of a washer 89.

The thermostat disk 83 is dish-shaped and formed of the same materials as the thermostat disk 23 described above. The construction is such that when the disk is subjected to predetermined temperature change, it will tend to flatten and ultimately snap into its reversely dished position. This action of the thermostat disk is utilized to snap the three contacts 89 into either their open or closed positions. When closed one of the contacts 89 bridges the gap between the contacts 59 and 61, another bridges the contacts 47 and 59, while the third contact 89 connects the contacts 49 and 61. These contacts, being in series, open the circuit at six points simultaneously and thus effectually prevent arcing.

Since the switch 38 is mounted in the casing 11 above the hood beneath which the pilot flame burns, its thermostat disk 83 will be heated by said flame and normally will stand in an upwardly dished position where it closes the switch. But when the pilot light flame is extinguished, the thermostat disk will cool and operate as described to snap into its downwardly dished position. In so doing the contacts 89 will be snapped sharply away from the contacts bridged thereby, and will interrupt the motor circuit and stop the motor. This shuts down the burner either by cutting off the supply of oil to the burner or by stopping the blower, or both.

As stated, it is desirable that the burner shall also be shut down automatically in case the water level in the boiler becomes too low. To accomplish this, a switch 91 of another control unit D (Figs. 1 and 2) is included in the motor circuit. This switch comprises a thermostat disk 93 carrying three floating contacts 95 adapted to bridge contacts mounted on a base 97 in a casing 99, the end contacts being connected in the motor circuit by the leads 101 and 103. The switch 91 may be substantially the same as the switch 38, above described. The casing 99 is provided with a water jacket 105 having a space in which an electric heater 107 of a common type is located, the terminals 109 and 111 of the heater coil being connected in the motor circuit by leads 113 and 115. The jacket communicates with the boiler through a pipe 117.

It will be evident that with this construction the water in the boiler can circulate freely through the jacket 105. So long as the jacket is filled with water its temperature cannot rise over 212° F. The thermostat disk 93 of the switch 91 is manually adjusted into an upwardly dished position where it holds the contacts 95 closed, and they will remain in this position so long as there is sufficient water in the boiler to substantially fill the jacket. If, however, the water level in the boiler drops too low, steam will form in the jacket, the temperature of the heater will rise, and the thermostat disk 93 will heat up and snap the contacts 95 into open position. This opens the motor circuit, stops the motor and shuts down the burner.

The temperature of the room or of the space or apparatus heated by the boiler or the burner is automatically regulated by a thermostat control C, the construction and arrangement being such that when the temperature of the room rises above a predetermined degree, the motor will be stopped, and when the temperature of the room falls below a predetermined degree, the motor will be started.

The room thermostat comprises a support 119 on which is mounted a U-shaped thermostat 121 of a common type. One end of this thermostat is attached to a block 125 on the support and is connected into the thermostat circuit by a lead 125. The opposite end of the thermostat is free and carries a contact 127 arranged to engage at times with a contact 129 in a block 131 also mounted on the support 119. The contact 129 is connected in the thermostat circuit by a lead 133. This thermostat is arranged to open the thermostat circuit upon a rise in temperature and to close said circuit again when the temperature drops.

An electric heater 135 (Fig. 1) comprising a coil having terminals 137 and 139 is connected into the thermostat circuit by leads 141 and 143 respectively. The heater 135 is mounted in a casing 145 which also contains a thermostat switch 147, similar to the thermostat switch 38 at the pilot light. When the switch 121 is closed, the heater 135 will maintain a sufficient temperature to hold the switch 147 in the motor circuit in its closed position, but when the temperature at the thermostat switch 121 rises sufficiently to break the thermostat circuit, the heater 135 will gradually cool, which, in turn, will cause the thermostat of the switch 147 to cool off gradually. Such cooling will require several minutes so that a substantial time lag will occur between the opening of the heater circuit by the room thermostat 121 and the opening of the motor circuit by the thermostat switch 147. In the meantime the contact 127 of the thermostat 121 will have moved farther away from the stationary contact 129 so that when the motor finally is stopped there will be no danger of its being started up again for a few seconds due to vibration of the thermostat 121. A similar time lag occurs when the thermostat 121 closes the heater circuit to bring the burner back into operation again. That is, several minutes will elapse after the heater circuit has been closed before the heater 135 can warm up the thermostat 147 sufficiently to cause it to close the motor circuit. This arrangement, therefore, effectually avoids the frequent starting and stopping of the motor when the room thermostat is in the process of making or breaking the circuit in which it is connected.

It will now be evident from the foregoing description, and from an inspection of Fig. 1, that the burner normally is regulated automatically in accordance with the temperature conditions in the dwelling which it is heating, through the action of the thermostat 121, the control exercised by this thermostat being effected indirectly through the control unit C. If the pilot light should be accidentally extinguished the flow of gas or other fuel thereto is automatically cut off by the control unit A. This also results in shutting down the burner through the action of the control unit B. If the water in the boiler 1 should drop to a dangerous level the burner would be automatically shut down by the control unit D. The switches of the units B, C and D are in series in the motor circuit, the switches in the units B and D normally being closed and the switch C being operated to start or stop the motor in response to changes in temperature of the room thermostat 121.

The unit D obviously would be used only in the event that the burner is employed to heat a boiler or some equivalent piece of apparatus. The number and arrangement of these control units that will be used in any installation obviously will depend upon the nature of the installation and the requirements under which it is operated.

It will readily be appreciated that the various units provided are extremely reliable, are economical to manufacture, and require practically no care or attention. The switches which control the motor circuit are valuable in being entirely automatic, of very simple construction, and having a very long life.

While I have herein shown the best embodiment of my invention that I have so far devised, it will be evident that the invention may be embodied in other forms without departing from the spirit or scope thereof.

Having thus described my invention, what I desire to claim as new is:

1. In a thermostatic control system for oil burning apparatus including an electric motor, the combination of a switch for controlling said motor, a thermostat normally holding said switch closed but operative to open it upon a drop in temperature below a predetermined point, an electric heater located closely adjacent to said thermostat and arranged to heat the thermostat, an electric circuit in which said heater is connected, and another thermostat for opening and closing said circuit.

2. In a thermostatic control system for oil burning apparatus including an electric motor, the combination of an electric circuit for the motor including a switch, a second electric circuit including a thermostat for making and breaking the second circuit in response to changes in temperature, and means controlled by the second circuit for opening and closing the switch in the motor circuit, said means being arranged to cause a substantial time lag between the opening or closing of said thermostat circuit and the operation of said switch.

3. In a thermostatic control system for oil burning apparatus including an electric motor, the combination of a switch for controlling said motor, a thermostat for operating said switch, an electric heater for operating said thermostat, an electric circuit for the heater, and a thermostat in the heater circuit for opening and closing said circuit in response to changes in temperature.

4. In a thermostatic control system for oil burning apparatus including an electric motor, the combination of an electric circuit for the motor including a switch, a thermostat for operating said switch, an electric heater in the motor circuit, and a water jacket for said heater adapted to receive water from a boiler and prevent the thermostat from opening the switch until the temperature of the heater rises to a predetermined point caused by lowering of the water level in the boiler.

5. In a thermostatic control system for oil burning apparatus including an electric motor, the combination of an electric circuit, an electric heater in said circuit, a thermostat for making and breaking said heater circuit, an electric circuit for the motor, and a thermostat switch in the motor circuit arranged to close the motor circuit when heated by said heater and to open the motor circuit on cooling of the heater following interruption of the heater circuit by the thermostat therein.

6. In a thermostatic control system for oil burning apparatus including a burner for heating a boiler and an electric motor for operating the burner, the combination of a pilot light for the burner, thermostatic means for cutting off the supply of fuel to the pilot light when its flame is extinguished, an electric circuit for the motor, thermostatic means operable when the pilot light flame is extinguished to interrupt the motor circuit, additional thermostatic means for opening or closing the motor circuit, and thermostatic means for interrupting the motor circuit when the level of water in a boiler drops to a predetermined limit.

7. In a thermostatic control system, the combination of an electric circuit, a support, contacts in the support connected with said circuit, a thermostatic switch on the support having provision for causing the same to snap into and out of engagement with said contacts when subject to predetermined temperature changes, an electric heater adjacent to said thermostatic switch, an electric circuit for the heater, and means for opening and closing said heater circuit to subject the thermostatic switch to the necessary temperature changes to operate it.

8. In a thermostatic control system for oil burning apparatus including a burner and an electric motor, the combination of a pilot light for the burner, thermostatic means for cutting off the supply of fuel to the pilot light when its flame is extinguished, an electric circuit for the motor, thermostatic means operable when the pilot light flame is extinguished to interrupt the motor circut, an electric circuit having a thermostat for opening and closing the same, and means controlled by the latter circuit for opening and closing the motor circuit with a substantial time lag after opening and closing of the thermostat circuit.

9. In thermostatic control apparatus including a burner and an electric motor, the combination of a pilot light for the burner, an electric circuit for the motor having switches therein, a thermostat subject to the heat of the pilot light for automatically opening one of said switches if the pilot light flame is extinguished, a thermostat circuit including a thermostat subject to room temperature and adapted to open and close the thermostat circuit, and means controlled by the thermostat circuit for opening one of the switches in the motor circuit with a time lag following the opening of the thermostat circuit.

10. In thermostatic control apparatus including a burner and an electric motor, the combination of a pilot light for the burner, an electric circuit for the motor having switches therein, a thermostat subject to the heat of the pilot light for automatically opening one of said switches if the pilot light flame is extinguished, a thermostat circuit including a thermostat subject to room temperature and adapted to open and close the thermostat circuit, an electric heater in the thermostat circuit, and a thermostat subject to the heat of said heater for automatically opening one of the switches in the motor circuit with a time lag following the opening of the thermostat circuit.

11. In a thermostatic control system for oil burning apparatus including an electric motor, the combination of an electric circuit for the motor having a switch therein an a thermostat for opening and closing said switch, an electric heater adjacent to said thermostat, an electric circuit for the heater, and a thermostat adapted to open and close the heater circuit, said motor circuit thermostat being operable to open and close the motor circuit switch after opening and closing of the heater circuit with substantial delay due to cooling and heating of the heater.

12. In a thermostatic control apparatus, the combination of a thermostatic switch for an electric circuit, an electric heater for said switch, and a water jacket for said heater.

ALVIN S. MANCIB.